Figure 1:
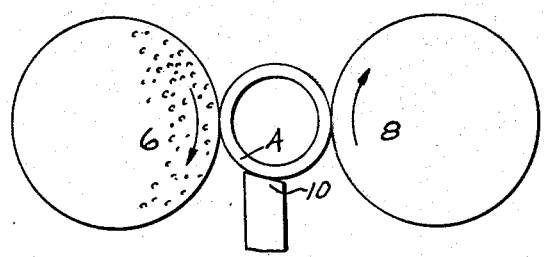

March 19, 1935.    R. H. CRAMER ET AL    1,994,754
MACHINING PROCESS
Filed July 14, 1932

INVENTORS:
RAYMOND H. CRAMER,
JOHN G. MORRELL,

BY Gales P. Moore
THEIR ATTORNEY

March 19, 1935.   R. H. CRAMER ET AL   1,994,754
MACHINING PROCESS
Filed July 14, 1932

INVENTORS:
RAYMOND H. CRAMER,
JOHN G. MORRELL,
BY *Gales P. Moore*
THEIR ATTORNEY Patented Mar. 19, 1935

1,994,754

UNITED STATES PATENT OFFICE 1,994,754

MACHINING PROCESS

Raymond H. Cramer and John G. Morrell, Newark, N. J., assignors to General Motors Corporation, Detroit, Mich., a corporation of Delaware Application July 14, 1932, Serial No. 622,504

11 Claims. (Cl. 51—278)

This invention relates to machining processes, especially the grinding of hollow articles, and comprises all of the features and aspects of novelty herein disclosed. Heretofore, in the manufacture of a sleeve or ring, for instance, it has been the practice to grind the exterior surface of the rough article as near as possible to circular form and size and then grind the bore of the article to the desired internal diameter. Centerless grinding machines will produce a piece that is approximately round but internal grinding machines using chucks, if they produce a round bore, are not entirely satisfactory for precision work because of the difficulty of centering the piece and getting uniform wall thickness, that is, concentricity of inner and outer walls. Improvement in this last respect has more recently been secured by the use of chuckless internal grinding machines but when the articles are relatively thin-walled and heat treated, an out-of-roundness develops. This is probably due to the release of internal strains by removal of stock and although the bad effect may become more or less neutralized if the sleeve is afterwards pressed into a round housing, it is desired to have a perfect article initially for all uses.

By the present invention, precision is greatly increased by alternately removing stock in increments from the outer and inner surfaces to gradually bring the piece to the desired size. Thus each surface is trued up after the removal of stock from the other surface may have impaired its shape and by dividing the stock removed into stages, the out-of-round condition is so minimized that it disappears or is not of consequence. Furthermore, the amount of stock removed at each cut can conveniently be made less and less and with progressively finer abrasives, and small marks or marring that sometimes result from the high pressure contact of the work with the driving wheels during a heavy cut are eliminated.

An object of the invention, accordingly, is to provide an improved method of precision machining of hollow articles. Another object is to provide a method of grinding hollow articles to counteract out-of-roundness. Another object is to provide a method of producing hollow articles having uniform wall thickness and smooth surfaces of accurate size both externally and internally.

To these ends and also to improve generally upon methods of this character, the invention consists in the various matters hereinafter described and claimed. In its broader aspects, the invention is not necessarily limited to the specific procedure disclosed for illustrative purposes in the accompanying drawing in which Figs. 1 to 5 are diagrammatic views of grinding machines showing several steps in the machining of a hollow article.

In Fig. 1, a sleeve A or other rough article to be machined to size is shown in grinding relation to a centerless grinding machine having a grinding wheel 6, a regulating wheel 8, and a work support 10. This machine is utilized to grind the external surface to round form but only a part of the stock is removed of that needed to bring the piece to size.

Figure 2:
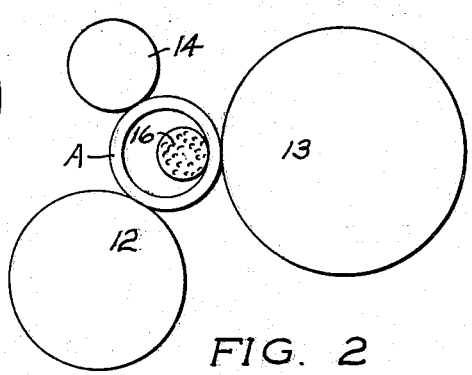

Referring to Fig. 2, the article is then transferred to an internal grinding machine, preferably a chuckless machine having a series of rotating wheels, one wheel 12 being a supporting idler, another wheel 13 being a driven regulating wheel, a third wheel 14 being a pressure idler which holds the work against the other wheels, and 16 being a grinding wheel. Wheels 13 and 16 and the article have their centers on a common line along which relative feeding movement can be produced if desired. Only a portion of the stock is removed of that needed to bring the piece to size.

Figure 3:
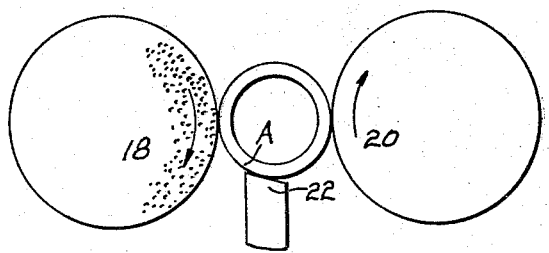

According to Fig. 3, the article is then reground externally on a centerless grinder having a grinding wheel 18, a regulating wheel 20 and a work support 22. Of course this could be the same machine used first but a second machine having a finer abrasive wheel is preferred. Any small out-of-roundness resulting from the release of strains during the internal grinding operation is removed by this second external grinding operation which preferably removes an amount of stock which will bring the piece almost down to the desired external diameter. Also any small marks or marring of the exterior surface, as from contact with the wheels 12, 13 or 14, are likewise removed.

Figure 4:
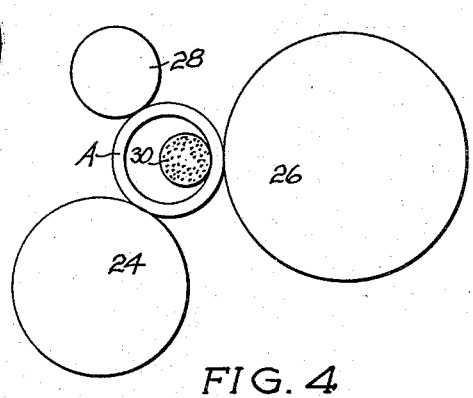

According to Fig. 4, the article is then reground internally on an internal grinding machine such as that having the supporting wheels 24, 26, 28 and a grinding wheel 30. Preferably the remainder of the internal stock removal occurs on this machine and the grinding wheel is desirably of finer grain than the grinding wheel 16 or otherwise produces a finer cut.

Figure 5:
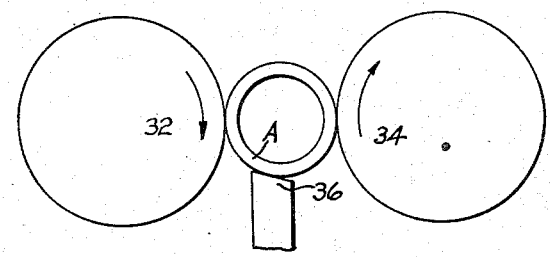
Figure 1:
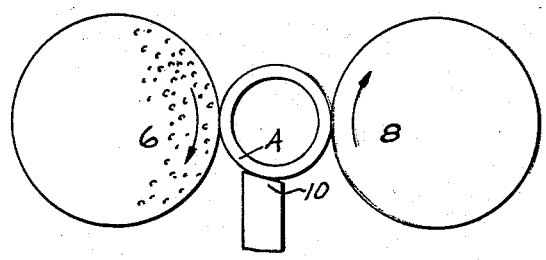
Figure 2:
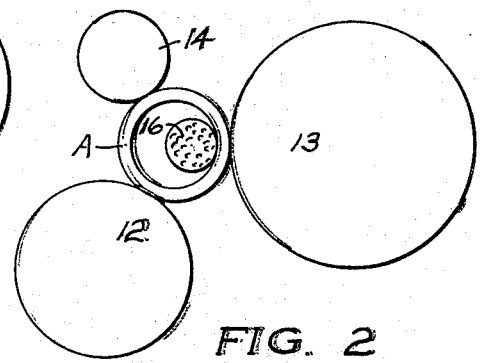
Figure 3:
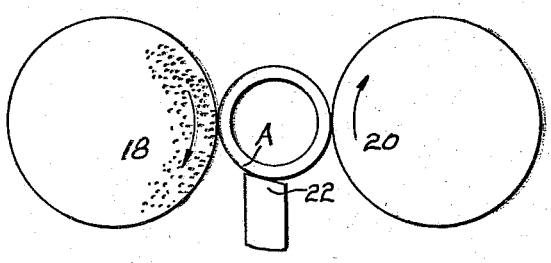
Figure 4:
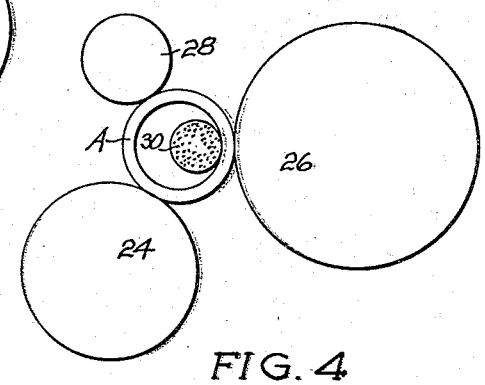
Figure 5:
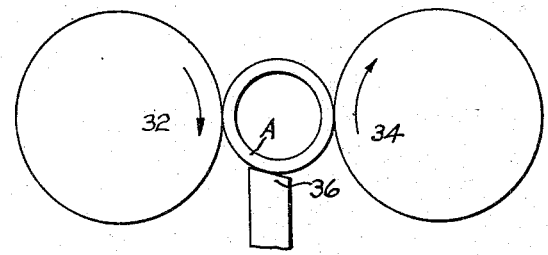

According to Fig. 5, the article is polished or buffed externally, removing all marks from the exterior, by a centerless grinding machine having a polishing wheel 32, a regulating wheel 34, and a work support 36. Of course, smaller increments of grinding could be given the piece if any out-of-round or marks still remained and the alternation could be continued as long as needed.

The applicants' "alternate" grinding of outer and inner surfaces is to be distinguished from mere "successive" grinding of such surfaces. By alternation, each kind of grinding is followed by that kind which precedes it, as day follows night and night follows day. There is a grinding operation of one kind intervening between two like grinding operations of another kind. The first of the like-operations on one surface does not bring that surface to final size but leaves stock for a corrective operation which is only repeated after stock has been removed from the other surface by the intervening operation. Thus any distortion of the first surface indirectly resulting from the intervening grinding operation on the other surface is not irrevocably imparted to the first surface without possibility of correction.

We claim:

1. The method of machining a hollow article to counteract out-of-roundness produced by stock removal, which consists in alternately removing stock from the exterior and interior surfaces to gradually bring the article to desired size and wall thickness; substantially as described.

2. The method of machining a hollow article, which consists in passing the article through two different grinding machines, one operating on the exterior and another on the interior of the article, and repeating the operation on the surface other than the last one treated to bring such surface to final size after the release of strains in the previous grinding; substantially as described.

3. The method of machining a hollow article, which consists in grinding the outer surface of the article part way to size on an external grinding machine, then transferring the article to a plurality of rotating supporting wheels and grinding the internal surface part way to size while the article is rotatably supported, and then repeating the operations; substantially as described.

4. The method of machining a hollow article, which consists in rotatably supporting the article on a plurality of wheels while grinding the inner surface, transferring the article to an external grinding machine and grinding the outer surface, and transferring the article to a plurality of wheels for further grinding on the inner surface; substantially as described.

5. The method of treating hollow articles, which consists in rough grinding one surface, rough grinding the other surface, and finish grinding said one surface; substantially as described.

6. The method of treating hollow articles, which consists in rough grinding the outer surface, rough grinding the inner surface, finish grinding the outer surface, and finish grinding the inner surface; substantially as described.

7. The method of treating hollow articles, which consists in rough grinding the outer surface, rough grinding the inner surface, finish grinding the outer surface, finish grinding the inner surface, and polishing the outer surface; substantially as described.

8. The method of treating hollow articles, which consists in removing stock from the outer surface but interrupting such removal of stock before final size is reached, then removing stock from the inner surface, and then removing more stock from the outer surface to bring it to size and shape after release of stains in the article due to the previous operations; substantially as described.

9. The method of treating hollow articles, which consists in removing stock from the inner surface, then removing stock from the outer surface, and then removing stock from the inner surface to produce the desired internal diameter; substantially as described.

10. The method of machining a hollow article, which consists in first grinding the outside surface part way to final size while rotatably supporting the article by its outer surface, then grinding the internal surface while rotatably supporting the article by its outer surface, then repeating the operation on the outer surface to shape it after it receives the effects of the previous grindings; substantially as described.

11. The method of making a hollow article to counteract out-of-roundness and produce a smooth finish, which consists in alternately passing the article through an external centerless grinding machine and an internal centerless grinding machine to gradually remove stock from outer and inner surfaces until the desired diameters and wall thickness are attained; substantially as described.

RAYMOND H. CRAMER.
JOHN G. MORRELL.